April 5, 1932.    E. J. STATOM    1,852,940
AVOCADO PICKER
Filed Dec. 29, 1930
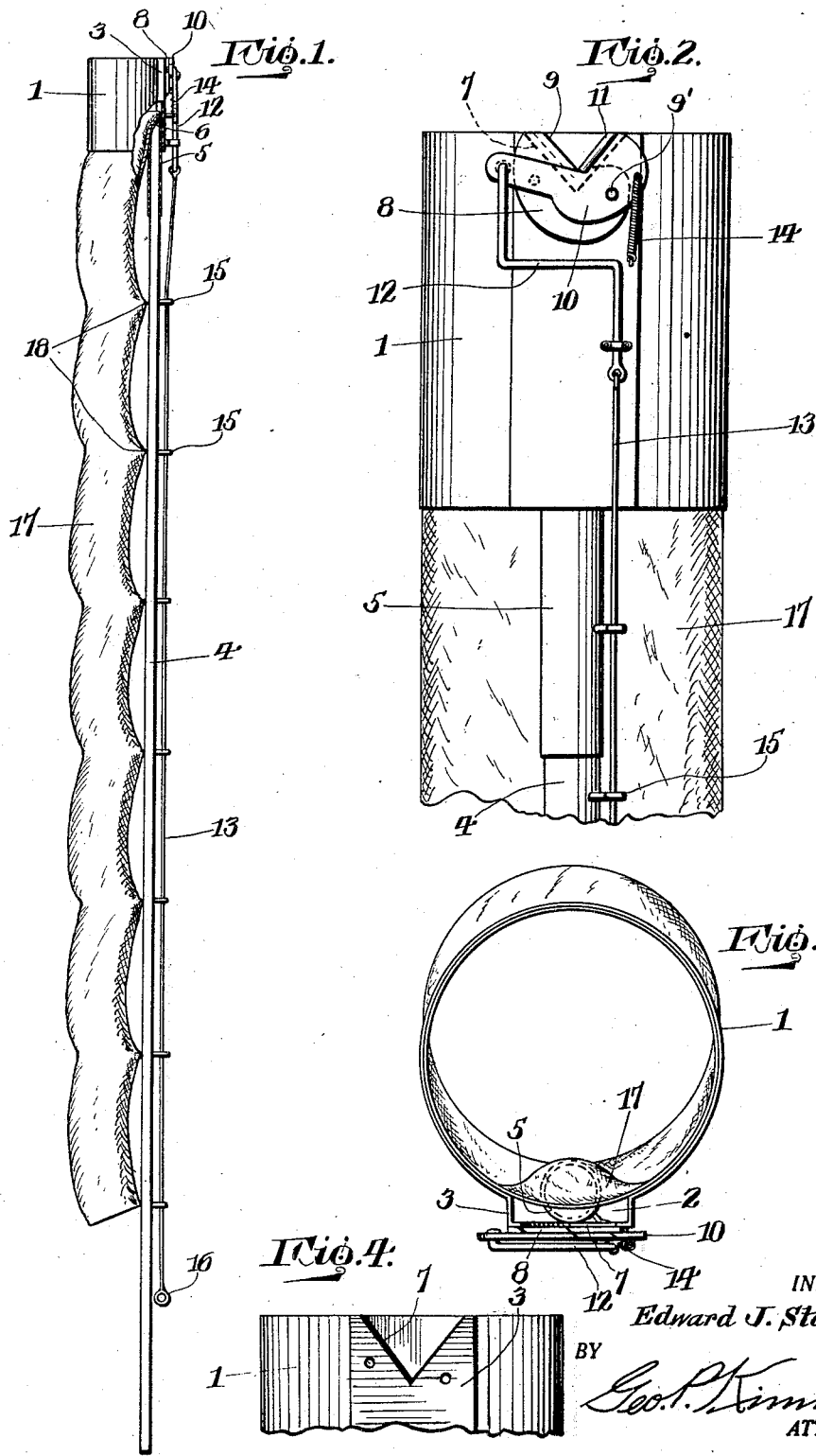
INVENTOR.
Edward J. Statom
BY
Geo. P. Kimmel
ATTORNEY.

Patented Apr. 5, 1932

1,852,940

UNITED STATES PATENT OFFICE

EDWARD J. STATOM, OF ALTA LOMA, CALIFORNIA

AVOCADO PICKER

Application filed December 29, 1930. Serial No. 505,434.

This invention relates to a fruit harvester particularly adapted for picking avocados, and has for its primary object to provide, in a manner as hereinafter set forth, a device of such character by means of which a given quantity of fruit may be picked in a shorter length of time than is possible by any other means known to the industry, thereby materially reducing the labor cost of picking the fruit.

A further object of the invention is to provide, in a manner as hereinafter set forth, a device of the character aforesaid which includes means for assembling the picked fruit in a container therefor without any likelihood of the fruit becoming bruised during the picking thereof.

Further objects of the invention are to provide, in a manner as hereinafter set forth, a fruit harvester of the character aforesaid which is comparatively simple in its construction and arrangement of parts, strong, durable, compact, thoroughly efficient in its intended use, and comparatively inexpensive to manufacture.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a side elevation of a fruit harvester in accordance with this invention.

Figure 2 is an enlarged fragmentary front elevation thereof.

Figure 3 is an enlarged top plan thereof.

Figure 4 is an enlarged fragmentary front elevation of the receptacle for receiving the picked fruit.

Referring to the drawings in detail, the numeral 1 indicates a rigid receptacle which is open at its top and bottom. The receptacle 1 preferably is of cylindrical construction, having its wall formed throughout the length of the receptacle with a laterally offset portion which provides the interior of the receptacle with an outwardly projecting portion 2 substantially rectangular in cross section. The offset portion of the wall of the receptacle is indicated by the numeral 3. The receptacle 1 is detachably mounted in any suitable manner on the upper end of a rigid pole 4 in order that the receptacle may be elevated a material distance from the ground during the use of the harvester. The mounting as shown for securing the receptacle to the pole includes a sleeve 5 which has an upper end portion of the pole extended therein, the sleeve having a peripheral portion thereof disposed within the projecting portion 2 of the interior of the container, and being formed with a rearwardly and downwardly sloping upper end indicated at 6. Formed in the offset wall portion 3 of the container is a substantially V-shaped notch 7 which opens through the upper edge of the wall portion 3.

Fixedly secured to the outer face of the wall portion 3 is a stationary cutting blade 8, the cutting edge 9 of which projects beyond and extends in parallel relation to one of the walls of the notch 7. Pivotally connected to the stationary blade 8 and to the wall portion 3, by means of a suitable pivot pin 9', is a movable blade 10 which is substantially in the form of a bell crank, and the cutting edge 11 of which is normally projected beyond and in parallel relation to the wall of the notch 7 which is opposite the cutting edge 9 of the stationary blade 8. Pivotally connected to the end of the blade 10 which is opposite the cutting edge 11 is an angular rod 12 which extends downwardly and the lower end of which is connected with a cable 13. The cutting edge 11 is normally maintained in spaced relation to the cutting edge 9 by means of a coiled spring 14, one end of which is secured to the blade 10 and the other end of which is secured to the wall portion 3. Upon the exertion of a dowward force on the rod 12, the blade 10 is swung about its pivot whereby the cutting edge 11 is advanced toward and beyond the cutting edge 9 in shearing relation to the latter. Upon the release of the downward force on the rod 12, the cutting edge 11 is returned to its normal position by the action of the spring 14. In order that a downward force may be exerted on the rod 12, remotely therefrom, the cable 13 is extended longitudinally of the pole 4, being maintained in position by means of suitable guides 15 projecting from the pole 4 at spaced points longitudinally of the latter. Preferably the cable 13 will be provided at its lower end with a suitable grip member 16.

Connected with the receptacle 1 is a container 17 which is substantially in the form of an elongated sack having an open upper end which is inserted within the receptacle 1 and is suitably secured therein with the upper edge portion of the sack resting against and extending above the sloping upper end 6 of the sleeve 5. At spaced points thereof, the container is secured to the pole 4, as indicated at 18, whereby the container is maintained substantially in parallel relation to the pole. Owing to the connection 18, there is a tendency for the wall of the container to extend in a series of slight curves which tend to break the fall of the fruit.

In the operation of the device, the receptacle 1 is positioned beneath and around the fruit to be picked with the stem of the fruit projecting between the spaced cutting edges 9 and 11 of the blades 8 and 10 respectively. The cutting edge 11 is then moved into shearing relation to the cutting edge 9 by the exertion of a downward force on the cable 13 to sever the stem supporting the fruit. The fruit drops through the receptacle 1 and into the container 17. Owing to the inclined upper face of the pole, and to the extension of the container over such face, a smooth surface is presented to the falling fruit, and any possibility of the fruit being bruised by the upper end of the pole or container is eliminated.

It is thought that the many advantages of a fruit harvester in accordance with this invention will be readily apparent, and although the preferred embodiment of the invention is as illustrated and described, it is to be understood that changes in the size, shape and arrangement of parts may be resorted to, so long as such changes fall within the scope of the invention as defined in the appended claims.

What I claim is:—

1. A fruit harvester comprising, a rigid receptacle adapted to be positioned beneath fruit to be picked, said receptacle being of cylindrical construction and having a laterally projecting portion extending throughout the length thereof, a cutting device carried by the laterally projecting portion of the receptacle and having a pair of cutting edges disposed above adjacent portions of the receptacle, a pole upon which the receptacle is mounted, said pole being extended into the laterally offset portion of the receptacle and having an inclined upper end face sloping downwardly and inwardly from the offset portion, means for operating the cutting device to sever the stem of the fruit above the receptacle, and a container depending from the receptacle for receiving the fruit therefrom, said container having a portion thereof adjacent its upper edge extended across the inclined upper edge of the pole.

2. A fruit harvester comprising, a receptacle adapted to be positioned beneath fruit to be picked, a stem cutting device carried by the receptacle, a pole extending into and secured to the receptacle adjacent the wall thereof, said pole having an inclined upper end face sloping downwardly and inwardly from said wall, a container for receiving the fruit from the receptacle, said container having a portion thereof adjacent its upper edge extended across the inclined upper end face of the pole, and means for operating the stem cutting device.

In testimony whereof, I affix my signature hereto.

EDWARD J. STATOM.